(12) United States Patent
Kato et al.

(10) Patent No.: US 8,932,178 B2
(45) Date of Patent: Jan. 13, 2015

(54) VEHICLE

(71) Applicants: Shunya Kato, Seto (JP); Akihiro Kimura, Toyota (JP); Yuma Mori, Nukata-gun (JP); Hideki Furuta, Anjo (JP)

(72) Inventors: Shunya Kato, Seto (JP); Akihiro Kimura, Toyota (JP); Yuma Mori, Nukata-gun (JP); Hideki Furuta, Anjo (JP)

(73) Assignees: Toyota Jidosha Kabushiki Kaisha, Toyota-Shi (JP); Aisin AW Co., Ltd., Anjo-Shi (JP)

( * ) Notice: Subject to any disclaimer, the term of this patent is extended or adjusted under 35 U.S.C. 154(b) by 0 days.

(21) Appl. No.: 14/134,706

(22) Filed: Dec. 19, 2013

(65) Prior Publication Data

US 2014/0179489 A1    Jun. 26, 2014

(30) Foreign Application Priority Data

Dec. 25, 2012  (JP) ................................. 2012-280915

(51) Int. Cl.
| | |
|---|---|
| *B60K 1/02* | (2006.01) |
| *B60W 10/04* | (2006.01) |
| *B60W 10/12* | (2012.01) |
| *B60W 10/06* | (2006.01) |
| *B60W 20/00* | (2006.01) |
| *B60W 10/115* | (2012.01) |
| *B60W 30/19* | (2012.01) |

(52) U.S. Cl.
CPC ............... *B60W 10/12* (2013.01); *B60W 10/06* (2013.01); *B60W 20/108* (2013.01); *B60W 10/115* (2013.01); *B60W 30/19* (2013.01); *B60W 20/30* (2013.01)

USPC ............................................. 477/3; 477/107

(58) Field of Classification Search
None
See application file for complete search history.

(56) References Cited

U.S. PATENT DOCUMENTS

| | | | | |
|---|---|---|---|---|
| 6,629,025 | B2 * | 9/2003 | Evans et al. ...................... | 701/22 |
| 6,991,584 | B2 * | 1/2006 | Cowan ........................... | 477/110 |
| 7,894,969 | B2 * | 2/2011 | Asami et al. ..................... | 701/84 |
| 8,579,760 | B2 * | 11/2013 | Imamura et al. .................. | 477/7 |
| 8,738,254 | B2 * | 5/2014 | Lee et al. ......................... | 701/58 |
| 2009/0157269 | A1 | 6/2009 | Matsubara et al. | |
| 2012/0196721 | A1 * | 8/2012 | He et al. ............................ | 477/3 |
| 2014/0148987 | A1 | 5/2014 | Otsubo et al. | |
| 2014/0180558 | A1 * | 6/2014 | Kato et al. ...................... | 701/102 |

FOREIGN PATENT DOCUMENTS

| | | |
|---|---|---|
| JP | 2006-335127 A | 12/2006 |
| JP | 2009-143388 A | 7/2009 |
| JP | 2009-154625 A | 7/2009 |
| WO | 2012/157061 A1 | 11/2012 |

* cited by examiner

*Primary Examiner* — Dirk Wright
(74) *Attorney, Agent, or Firm* — Kenyon & Kenyon LLP

(57) ABSTRACT

A vehicle includes a transmission between an engine and a drive wheel and includes a differential mechanism (planetary gear mechanism) between the engine and an engagement device (transmission). A controller (ECU) included in the vehicle calculates a variation rate in the whole rotation energy of the planetary gear mechanism when it is in the inertia phase of a shift. The ECU increasingly corrects an engine generated power and decreasingly corrects a transmission transfer power when the variation rate is higher than 0. The ECU decreasingly corrects the engine generated power and increasingly correct the transmission transfer power when the variation rate is lower than 0.

14 Claims, 14 Drawing Sheets

F I G . 12

| PATTERN | Esum VARIATION (● → ■) | $P_e$ CORRECTION | $P_c$ CORRECTION |
|---|---|---|---|
| (3) | INCREASE | INCREASE | DECREASE |
| (4) | DECREASE | DECREASE | INCREASE |
| (5) | BEFORE PASSING (● → ▲) : DECREASE<br>THROUGH L1<br>AT PASSING (▲) : LOCAL MINIMUM<br>THROUGH L1<br>AFTER PASSING (▲ → ■) : INCREASE<br>THROUGH L1 | DECREASE | INCREASE |

VEHICLE

INCORPORATION BY REFERENCE

The disclosure of Japanese Patent Application No. 2012-280915 filed on Dec. 25, 2012 including the specification, drawings and abstract is incorporated herein by reference in its entirety.

BACKGROUND OF THE INVENTION

1. Field of the Invention

The invention relates to a vehicle that includes an engagement device (a transmission, a clutch, or the like) between an internal combustion engine and a drive wheel and that includes a differential mechanism (a planetary gear mechanism, or the like), including at least three rotating elements, between the internal combustion engine and the engagement device.

2. Description of Related Art

Japanese Patent Application Publication No. 2006-335127 (JP 2006-335127 A) describes a vehicle that includes a transmission (engagement, device) between an engine and drive wheels and that includes a planetary gear mechanism (differential mechanism) between the engine and the transmission. The planetary gear mechanism includes a sun gear coupled to a first motor, a ring gear coupled to a second motor and the drive wheels via the transmission, pinions meshed with the sun gear and the ring gear, and a carrier coupled to the engine. JP 2006-335127 A describes a technique for, in the above-described vehicle, suppressing a shift shock by controlling the rotation speed of the ring gear with the use of at least one of the first motor and the second motor during shifting of the transmission.

However, in the vehicle described in JP 2006-335127 A, at the time when the rotation speed of the ring gear is controlled during shifting of the transmission, if the power generated by the engine is controlled without considering a variation in the rotation energy of the planetary gear mechanism, the shift may stagnate, with the result that it may not be possible to attain an appropriate shifting time.

That is, in an ordinary engine vehicle in which no planetary gear mechanism is provided between an engine and a transmission, there is a steady positive correlation (correlation in which, as one increases, the other also increases; and, as one decreases, the other also decreases) between the power generated by the engine and a rotation variation in the input shaft of the transmission. Thus, it is possible to facilitate a downshift by increasingly correcting the power generated by the engine and to facilitate an upshift by decreasingly correcting the power generated by the engine.

Incidentally, in a vehicle in which a planetary gear mechanism is provided between an engine and a transmission as in the case of the vehicle described in JP 2006-335127 A, depending on the state of the planetary gear mechanism, the correlation between the power generated by the engine and a rotation variation in the input shaft of the transmission may change and become a negative correlation (correlation in which, as one increases, the other decreases; and, as one decreases, the other increases). Therefore, in the vehicle described in JP 2006-335127 A, if a correction as in the case of the ordinary engine vehicle is performed, a shift in the transmission may stagnate depending on the state of the planetary gear mechanism.

SUMMARY OF THE INVENTION

The invention provides a vehicle that includes an engagement device between an internal combustion engine and a drive wheel and that includes a differential mechanism, including at least three rotating elements, between the internal combustion engine and the engagement device, and that achieves an appropriate shifting time.

An aspect of the invention provides a vehicle including an internal combustion engine, an engagement device, a differential mechanism and a controller. The internal combustion engine is configured to generate power for rotating a drive wheel. The engagement device is provided between the internal combustion engine and the drive wheel, and the engagement device is configured to switch into any one of an engaged state, a slipped state and a released state. The differential mechanism is provided between the internal combustion engine and the engagement device, and the differential mechanism has at least three rotating elements including a first rotating element coupled to the internal combustion engine and a second rotating element coupled to the drive wheel via the engagement device. The controller is configured to control the internal combustion engine and the engagement device. The controller is configured to correct at least one of the power generated by the internal combustion engine and power transmitted by the engagement device on the basis of a variation in rotation energy of the differential mechanism, when the engagement device is in the slipped state or the released state.

The controller may be configured to at least increasingly correct the generated power or decreasingly correct the transmitted power when the rotation energy increases, and the controller is configured to at least decreasingly correct the generated power or increasingly correct the transmitted power when the rotation energy decreases.

The controller may be configured to increase a correction amount of at least one of the generated power and the transmitted power as a variation amount in the rotation energy increases.

The differential mechanism may include a third rotating element in addition to the first and second rotating elements. The vehicle may further include a rotary electric machine coupled to the third rotating element and an electrical storage device configured to be able to exchange electric power with the rotary electric machine. The controller may be configured to change a correction amount of at least one of the generated power and the transmitted power on the basis of chargeable and dischargeable powers of the electrical storage device.

The differential mechanism may be a planetary gear mechanism including a sun gear; a ring gear; pinions meshed with the sun gear and the ring gear; and a carrier that holds the pinions such that the pinions are rotatable and revolvable. The first rotating element may be the carrier, the second rotating element may be the ring gear, and the third rotating element may be the sun gear.

The controller may be configured to calculate a total energy variation rate, the total energy variation rate being a variation amount per unit time in total energy that is a whole rotation energy of the differential mechanism. The controller may be configured to change at least one of the absolute value of a correction amount of the generated power of the internal combustion engine and the absolute value of a correction amount of the transmitted power of the engagement device on the basis of the absolute value of the total energy variation rate.

The vehicle may further include a rotary electric machine coupled to the third rotating element and an electrical storage device configured to exchange electric power with the rotary electric machine, and the controller may be configured to change at least one of the absolute value of the correction amount of the generated power of the internal combustion engine and the absolute value of the correction amount of the transmitted power of the engagement device on the basis of an input allowance electric power or output allowance electric power of the electrical storage device in addition to the total energy variation rate.

The controller may be configured to change which one of the generated power and the transmitted power is preferentially corrected on the basis of a required driving power and the transmitted power.

The controller may be configured to preferentially increasingly correct the transmitted power rather than decreasingly correct the generated power when a variation rate of the required driving power is higher than a predetermined rate and the transmitted power is lower than a predetermined power.

The engagement device may be a transmission configured to be able to change a speed ratio. The controller may be configured to correct at least one of the generated power and the transmitted power on the basis of a variation in the rotation energy of the differential mechanism when the transmission is shifting.

In a first region in which a rotation speed of the second rotating element is higher than a boundary value determined on the basis of a rotation speed of the first rotating element, the rotation energy of the differential mechanism decreases with a decrease in the rotation speed of the second rotating element, and, in a second region in which the rotation speed of the second rotating element is lower than the boundary value, the rotation energy of the differential mechanism increases with a decrease in the rotation speed of the second rotating element. The controller may be configured to at least decreasingly correct the generated power or increasingly correct the transmitted power when the rotation speed of the second rotating element falls within the first region when the transmission is upshifting. The controller may be configured to at least increasingly correct the generated power or decreasingly correct the transmitted power when the rotation speed of the second rotating element falls within the second region when the transmission is upshifting.

In a first region in which a rotation speed of the second rotating element is higher than a boundary value determined on the basis of a rotation speed of the first rotating element, the rotation energy of the differential mechanism increases with an increase in the rotation speed of the second rotating element, and, in a second region in which the rotation speed of the second rotating element is lower than the boundary value, the rotation energy of the differential mechanism decreases with an increase in the rotation speed of the second rotating element. The controller may be configured to at least increasingly correct the generated power or decreasingly correct the transmitted power when the rotation speed of the second rotating element falls within the first region when the transmission is downshifting. The controller may be configured to at least decreasingly correct the generated power or increasingly correct the transmitted power when the rotation speed of the second rotating element falls within the second region when the transmission is downshifting.

The controller may be configured to at least decreasingly correct the generated power or increasingly correct the transmitted power on the basis of a difference between the rotation energy at the start of shifting and the rotation energy at the local minimum, when there is a time at which the rotation energy of the differential mechanism is local minimum in a period from a start of shifting of the transmission and an end of shifting of the transmission.

With the above-described vehicle according to the invention, when an engagement device is provided between an internal combustion engine and a drive wheel and a differential mechanism having at least three rotating elements is provided between the internal combustion engine and the engagement device, it is possible to achieve an appropriate shifting time.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 12 is a view that shows correction methods executed by an ECU according to the third embodiment of the invention;

DETAILED DESCRIPTION OF EMBODIMENTS

Figure 1:
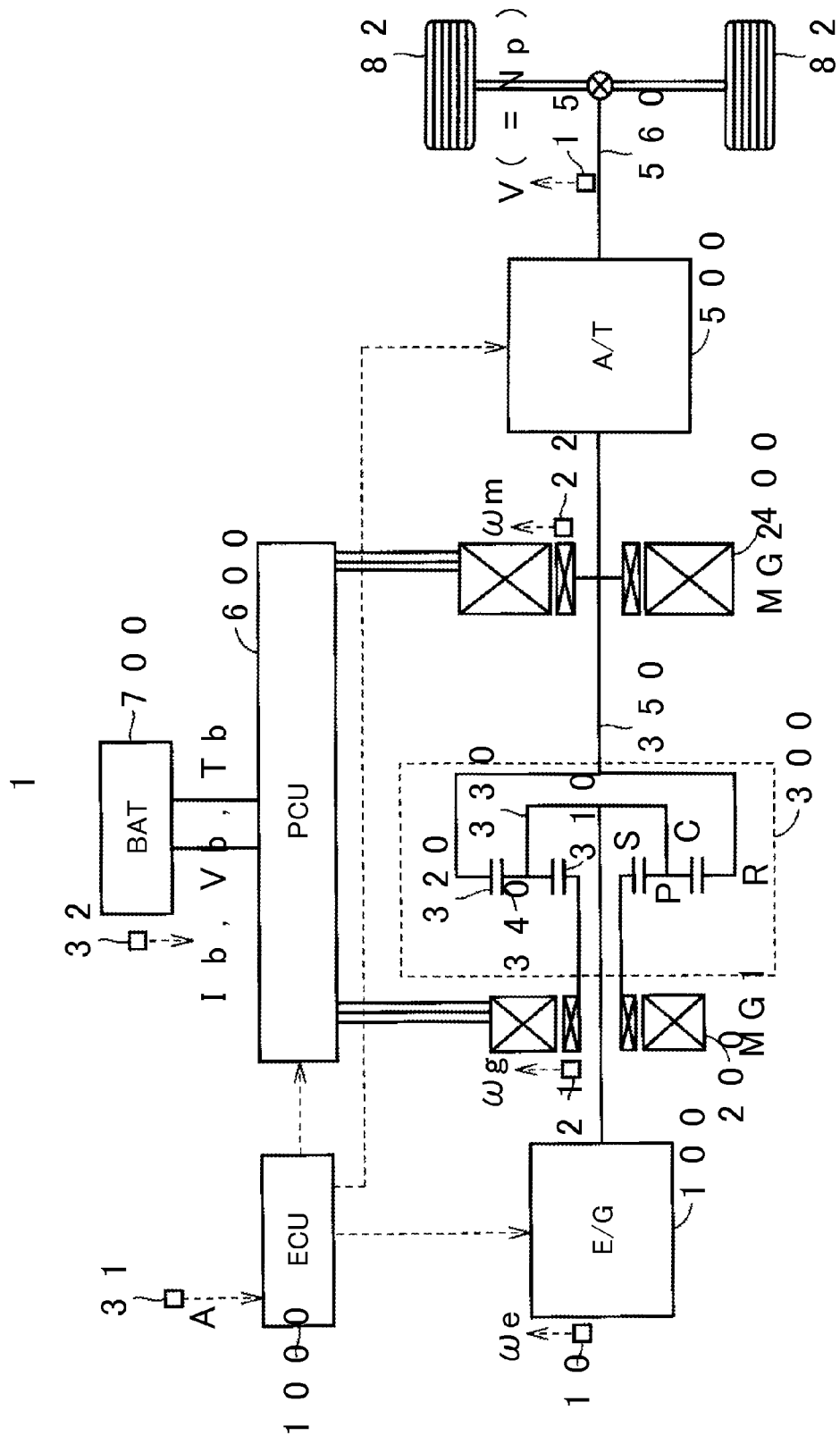
FIG. 1 is an overall block diagram of a vehicle according to first to third embodiments of the invention.

Hereinafter, embodiments of the invention will be described with reference to the accompanying drawings. In the following description, like reference numerals denote the same components. Names and functions of them are also the same. Thus, the detailed description thereof will not be repeated.

In the specification, the term "electric power" may mean electric power (power) in the narrow sense and may mean the amount of electric power (work) or electric energy, which is electric power in the broad sense, and may be flexibly construed depending on a situation in which the term is used.

FIG. 1 is an overall block diagram of a vehicle 1 according to a first embodiment of the invention. The vehicle 1 travels by rotating drive wheels 82. The vehicle 1 includes an engine (E/G) 100, a first motor generator (hereinafter, referred to as "first MG") 200, a power split unit 300, a second motor generator (hereinafter, referred to as "second MG") 400, an automatic transmission (A/T) 500, a power control unit (hereinafter, referred to as "PCU") 600, a battery 700, and an electronic control unit (hereinafter, referred to as "ECU") 1000 that serves as a controller.

The engine 100 generates power (driving power Pv) for rotating the drive wheels 82. The power generated by the engine 100 is input to the power split unit 300.

The power split unit 300 splits the power input from the engine 100 into the power that is transmitted to the drive wheels 82 via the automatic transmission 500 and the power that is transmitted to the first MG 200.

The power split unit 300 is a planetary gear mechanism (differential mechanism) that includes a sun gear (S) 310, a ring gear (R) 320, a carrier (C) 330 and pinions (P) 340. The sun gear (S) 310 is coupled to a rotor of the first MG 200. The ring gear (R) 320 is coupled to the drive wheels 82 via the automatic transmission 500. The pinions (P) 340 are in mesh with the sun gear (S) 310 and the ring gear (R) 320. The carrier (C) 330 holds the pinions (P) 340 such that the pinions (P) 340 are rotatable and revolvable. The carrier (C) 330 is coupled to a crankshaft of the engine 100.

The first MG 200 and the second MG 400 are alternating-current rotary electric machines, and each function as not only a motor but also a generator. In the present embodiment, the second MG 400 is provided between the power split unit 300 and the automatic transmission 500. More specifically, a rotor of the second MG 400 is connected to a rotary shaft 350 that couples the ring gear (R) 320 of the power split unit 300 to an input shaft of the automatic transmission 500.

The automatic transmission 500 is provided between the rotary shaft 350 and a drive shaft 560. The automatic transmission 500 includes a gear unit and a hydraulic circuit. The gear unit includes a plurality of hydraulic friction engagement elements (clutches, brakes, and the like). The hydraulic circuit supplies each of the friction engagement elements with hydraulic pressure based on a control signal from the ECU 1000. When engagement states of the plurality of friction engagement elements are changed, the automatic transmission 500 is shifted into any one of an engaged state, a slipped state and a released state. In the engaged state, all the rotation power of the input shaft of the automatic transmission 500 is transmitted to an output shaft of the automatic transmission 500. In the slipped state, part of the rotation power of the input shaft of the automatic transmission 500 is transmitted to the output shaft of the automatic transmission 500. In the released state, transmission of power between the input shaft and output shaft of the automatic transmission 500 is interrupted. In addition, the automatic transmission 500 is configured to be able to shift into any one of a plurality of speed positions (speed ratios) having predetermined speed ratios (the ratios of an input shaft rotation speed to an output shaft rotation speed) in the engaged state. The automatic transmission 500 is normally controlled to the engaged state; however, the automatic transmission 500 is temporarily placed in the slipped state or the released state during shifting, and is returned to the engaged state again after the end of the shift.

The PCU 600 converts direct-current power, supplied from the battery 700, to alternating-current power, and outputs the alternating-current power to the first MG 200 and the second MG 400. Thus, the first MG 200 and/or the second MG 400 are driven. In addition, the PCU 600 converts alternating-current power, generated by the first MG 200 and/or the second MG 400, to direct-current power, and outputs the direct-current power to the battery 700. Thus, the battery 700 is charged.

The battery 700 stores high-voltage (for example, about 200 V) direct-current power for driving the first MG 200 and/or the second MG 400. The battery 700 is typically formed to include nickel hydride or lithium ions. Instead of the battery 700, a large-capacitance capacitor may also be employed.

Furthermore, the vehicle 1 includes an engine rotation speed sensor 10, a vehicle speed sensor 15, resolvers 21, 22, an accelerator position sensor 31 and a monitoring sensor 32. The engine rotation speed sensor 10 detects the rotation speed of the engine 100 (hereinafter, referred to as "engine rotation speed $\omega e$"). The vehicle speed sensor 15 detects the rotation speed of the drive shaft 560 as a vehicle speed V. The resolver 21 detects the rotation speed of the first MG 200 (hereinafter, referred to as "first MG rotation speed $\omega g$"). The resolver 22 detects the rotation speed of the second MG 400 (hereinafter, referred to as "second MG rotation speed $\omega m$"). The accelerator position sensor 31 detects a user's operation amount of an accelerator pedal (hereinafter, referred to as "accelerator operation amount A"). The monitoring sensor 32 detects the state of the battery 700 (battery voltage Vb, battery current Ib, battery temperature Tb, and the like). These sensors output detected results to the ECU 1000.

The ECU 1000 incorporates a central processing unit (CPU) (not shown) and a memory (not shown), and executes predetermined arithmetic processing on the basis of information stored in the memory and information from the sensors. The ECU 1000 controls devices mounted on the vehicle 1 on the basis of the result of arithmetic processing.

The ECU 1000 determines a required driving power Pvreq on the basis of the accelerator operation amount A and the vehicle speed V. The ECU 1000 calculates an engine target power Petag, a first MG target power Pgtag and a second MG target power Pmtag in accordance with a predetermined algorithm such that the required driving power Pvreq is satisfied. The ECU 1000 controls the engine 100 (specifically, ignition timing, throttle opening degree, fuel injection amount, and the like) such that an actual engine power becomes the engine target power Petag. In addition, the ECU 1000 controls current flowing through the first MG 200 by controlling the PCU 600 such that an actual power of the first MG 200 becomes the first MG target power Pgtag. Similarly, the ECU 1000 controls current flowing through the second MG 400 by controlling the PCU 600 such that an actual power of the second MG 400 becomes the second MG target power Pmtag.

The ECU 1000 calculates the state of charge (hereinafter, also referred to as "SOC") of the battery 700 on the basis of the detected result of the monitoring sensor 32. The ECU 1000 sets a battery outputtable electric power WOUT and a battery inputtable electric power WIN (both in watts) on the basis of the SOC, the battery temperature Tb, and the like. The ECU, 1000 controls the PCU 600 such that an actual output electric power Pbout of the battery 700 does not exceed the battery outputtable electric power WOUT. In addition, the ECU 1000 controls the PCU 600 such that an actual input electric power Pbin of the battery 700 does not exceed the battery inputtable electric power WIN.

The ECU 1000 determines a target speed position corresponding to the accelerator operation amount A and the vehicle speed V by consulting a predetermined shift map, and controls the automatic transmission 500 such that an actual speed position becomes the target speed position. As described above, the automatic transmission 500 is normally controlled to the engaged state; however, the automatic transmission 500 is temporarily placed in the slipped state or the released state during shifting (during upshifting or during downshifting), and is returned to the engaged state again after the end of the shift.

Figure 2:
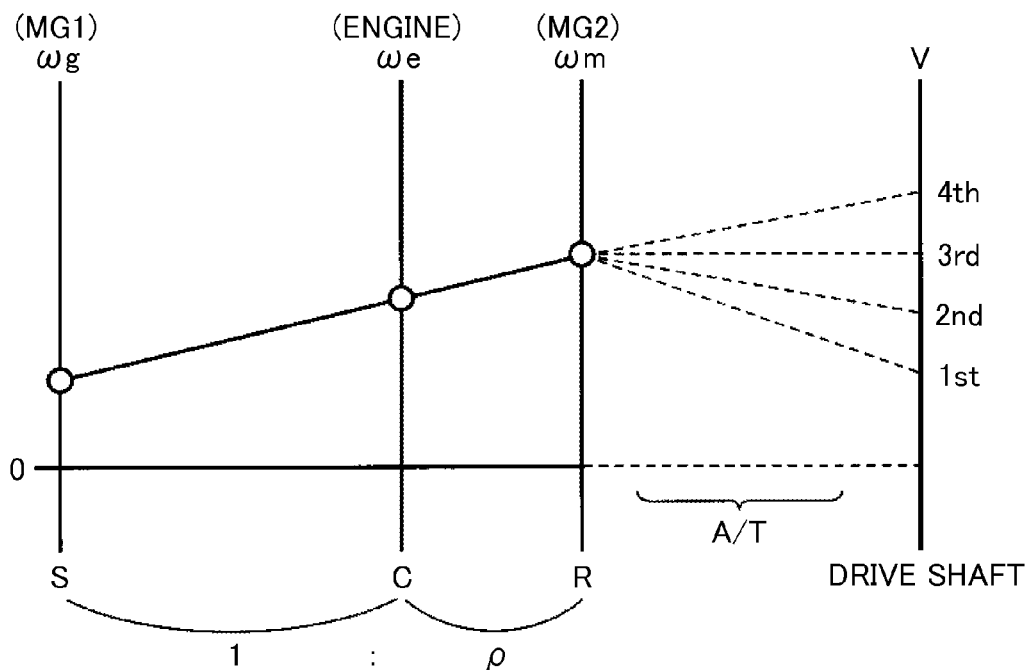
FIG. 2 is a nomograph of a power split unit mounted on the vehicle according to the first to third embodiments of the invention.

FIG. 2 shows a nomograph of the power split unit 300. As shown in FIG. 2, the rotation speed of the sun gear (S) 310 (that is, the first MG rotation speed ωg), the rotation speed of the carrier (C) 330 (that is, the engine rotation speed ωe) and the rotation speed of the ring gear (R) 320 (that is, the second MG rotation speed ωm) have the relationship connected by a straight line on the nomograph of the power split unit 300 (the relationship in which, when any two rotation speeds are determined, the remaining rotation speed is also determined). In the present embodiment, the automatic transmission (A/T) 500 is provided between the ring gear (R) 320 and the drive shaft 560. Therefore, the ratio between the second MG rotation speed ωm and the vehicle speed V is determined by the speed position (speed ratio) established by the automatic transmission 500. FIG. 2 illustrates the case where the automatic transmission 500 is able to establish any one of first to fourth forward speed positions.

Figure 3:
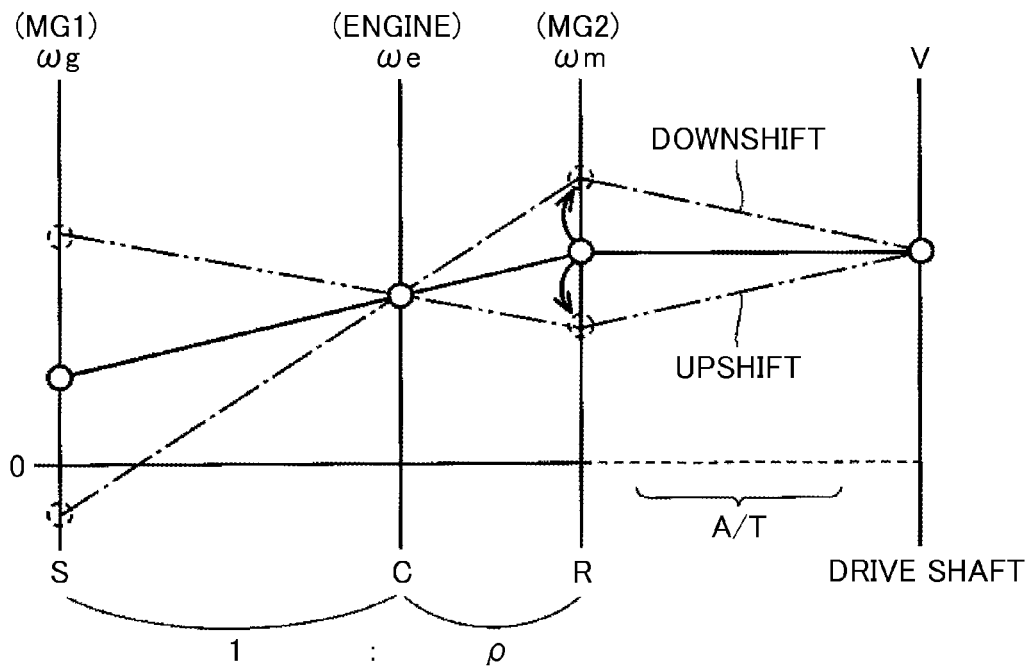
FIG. 3 is a view that schematically shows a state of a rotation variation at the time of shifting of an automatic transmission mounted on the vehicle according to the first to third embodiments of the invention.

FIG. 3 is a view that schematically shows a state of a rotation variation at the time of shifting of the automatic transmission 500 on the nomograph. As shown in FIG. 3, at the time of shifting (downshifting or upshifting), the vehicle speed V remains almost unchanged and fixed. Therefore, at the time of downshifting (at the time of increasing the speed ratio), it is required to increase the input shaft rotation speed of the automatic transmission 500 (that is, the second MG rotation speed ωm) as indicated by the alternate long and short dashed line. Conversely, at the time of upshifting (at the time of decreasing the speed ratio), it is required to decrease the input shaft rotation speed of the automatic transmission 500 as indicated by the alternate long and two-short dashed line.

In an ordinary engine vehicle, no device corresponding to the power split unit 300 is provided between an engine and an automatic transmission. Therefore, there is a steady positive correlation (relationship in which, as one increases, the other also increases; and, as one decreases, the other also decreases) between an engine power and a rotation variation in the input shaft of the automatic transmission. Thus, at the time of downshifting, by increasingly correcting the engine power (or by decreasingly correcting the transmitted power of the automatic transmission), it is possible to facilitate the shift by increasing the input shaft rotation speed of the automatic transmission. At the time of upshifting, by decreasingly correcting the engine power (or by increasingly correcting the transmitted power of the automatic transmission), it is possible to facilitate the shift by decreasing the input shaft rotation speed of the automatic transmission.

Incidentally, in the vehicle 1 according to the present embodiment, the power split unit 300 is provided between the engine 100 and the automatic transmission 500. In the thus configured vehicle 1, if a correction as in the case of the ordinary engine vehicle is performed, a shift may not be facilitated and rather a shift may stagnate depending on the state of the power split unit 300. This point will be described in detail with reference to FIG. 4.

Figure 4:
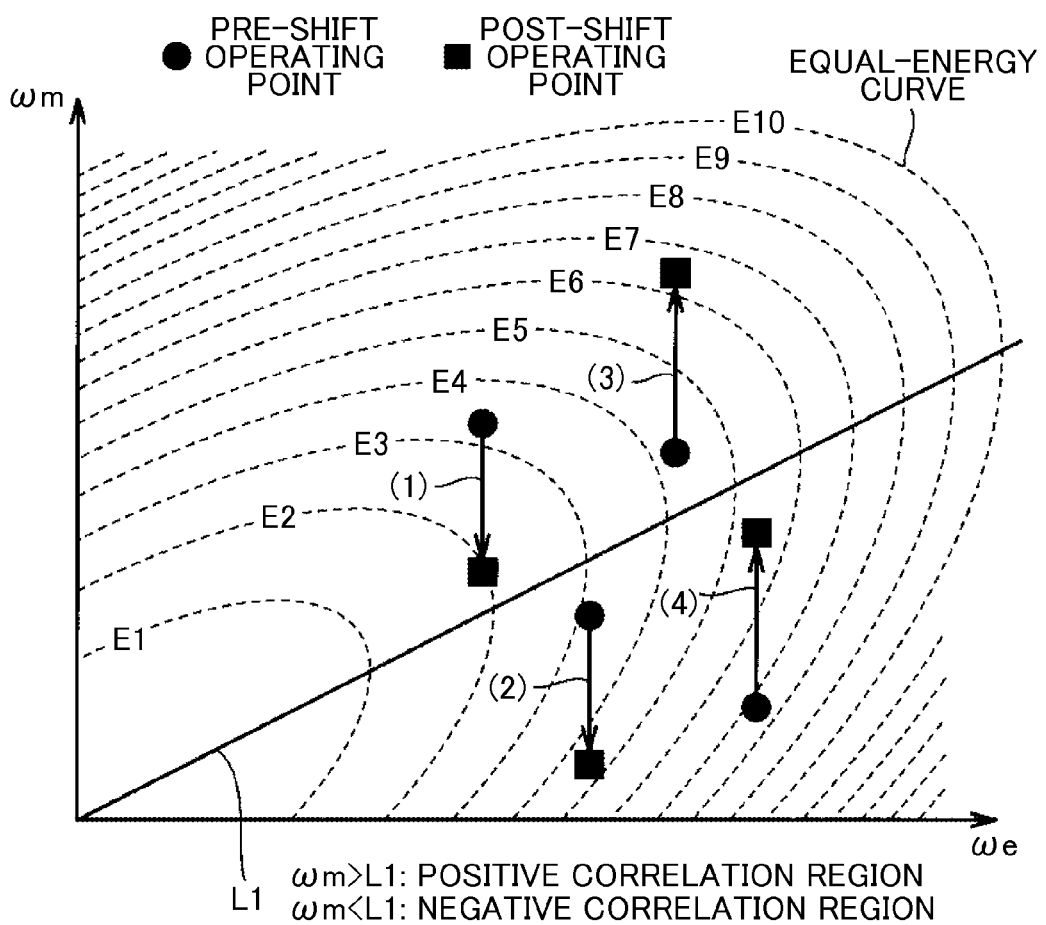
FIG. 4 is a view that shows the distribution of the whole rotation energy of the power split unit according to the first embodiment of the invention.

FIG. 4 is a view that shows the distribution of the whole rotation energy of the power split unit 300 using an equal-energy curve group (which shows a curve connecting equal energy points at intervals of predetermined energy). In FIG. 4, the abscissa axis represents the engine rotation speed ωe (the rotation speed of the carrier (C) 330), and the ordinate axis represents the second MG rotation speed ωm (the rotation speed of the ring gear (R) 320). As described above with reference to FIG. 2, when the engine rotation speed ωe and the second MG rotation speed ωm are determined, the remaining first MG rotation speed ωg (the rotation speed of the sun gear (S) 310) is also determined, so it is possible to determine the rotation speeds of all the rotating elements in the power split unit 300. Therefore, by using the engine rotation speed ωe and the second MG rotation speed ωm as parameters, the whole rotation energy of the power split unit 300 (hereinafter, also simply referred to as "total energy Esum") is determined. Values E1, E2, E3, . . . , E10, . . . of the total energy Esum, indicated by the equal-energy curves, increase toward a far side from the origin. That is, there is the relationship that E1<E2<E3<E4, . . . , <E10, . . . .

As is apparent from FIG. 4, when the engine rotation speed ωe remains unchanged, the correlation between the second MG rotation speed ωm and the total energy Esum in a region above a boundary line L1 and the correlation in a region below the boundary line L1 are opposite. Specifically, in the region above the boundary line L1, there is a positive correlation (correlation in which, as one increases, the other also increases; and, as one decreases, the other also decreases) between the second MG rotation speed ωm and the total energy Esum. Therefore, hereinafter, the region above the boundary line L1 is also referred to as "positive correlation region". On the other hand, in the region below the boundary line L1, there is a negative correlation (correlation in which, as one increases, the other decreases; and, as one decreases, the other increases) between the second MG rotation speed ωm and the total energy Esum. Therefore, hereinafter, the region below the boundary line L1 is also referred to as "negative correlation region".

The boundary line L1 may be expressed by the following relational expression (a).

$$\omega m = \{(1+\rho)Ig/(Ig+\rho^2 Im)\}\omega e \qquad (a)$$

In the mathematical expression (a), "Ig" denotes the moment of inertia of the first MG 200, "Im" denotes the moment of inertia of the second MG 400, and "ρ" denotes the planetary gear ratio of the power split unit 300.

In FIG. 4, typical rotation variations at the time of shifting are shown in pattern (1) to pattern (4). In FIG. 4, the case where the engine rotation speed ωe remains almost unchanged at the time of shifting is assumed.

When an upshift is carried out in the positive correlation region, the second MG rotation speed ωm decreases as indicated by the pattern (1) in FIG. 4, and the total energy Esum also decreases accordingly. In other words, when an upshift is carried out in the positive correlation region, it is required to decrease the total energy Esum. On the other hand, when an upshift is carried out in the negative correlation region, the second MG rotation speed ωm decreases as indicated by the pattern (2) in FIG. 4; however, the total energy Esum increases. In other words, when an upshift is carried out in the negative correlation region, it is required to increase the total energy Esum.

When a downshift is carried out in the positive correlation region, the second MG rotation speed ωm increases as indicated by the pattern (3) in FIG. 4, and the total energy Esum also increases accordingly. In other words, when a downshift is carried out in the positive correlation region, it is required to increase the total energy Esum. On the other hand, when a downshift is carried out in the negative correlation region, the second MG rotation speed ωm increases as indicated by the pattern (4) in FIG. 4; however, the total energy Esum decreases. In other words, when a downshift is carried out in the negative correlation region, it is required to decrease the total energy Esum.

In view of such characteristics, the ECU 1000 according to the present embodiment corrects at least one of the power that is generated by the engine 100 (hereinafter, also referred to as "engine generated power Pe") and the power that is transmitted by the automatic transmission 500 (hereinafter, also referred to as "transmission transfer power Pc") on the basis of a variation in the total energy Esum during shifting.

Figure 5:
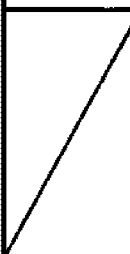
FIG. 5 is a view that shows correction methods executed by an ECU according to the first embodiment.

FIG. 5 is a view that shows correction methods for the engine generated power Pe and the transmission transfer-power Pc, executed by the ECU 1000. In the case of the pattern (1) in which an upshift is carried out in the positive correlation region, with a decrease in the second MG rotation speed ωm, the total energy Esum also decreases. In this case, the ECU 1000 facilitates a decrease in the total energy Esum by decreasingly correcting the engine generated power Pe and increasingly correcting the transmission transfer power Pc.

In the case of the pattern (2) in which an upshift is carried out in the negative correlation region, the second MG rotation speed ωm decreases; however, the total energy Esum increases. In this case, the ECU 1000 facilitates an increase in the total energy Esum by increasingly correcting the engine generated power Pe and decreasingly correcting the transmission transfer power Pc.

In the case of the pattern (3) in which a downshift is carried out in the positive correlation region, with an increase in the second MG rotation speed ωm, the total energy Esum also increases. In this case, the ECU 1000 facilitates an increase in the total energy Esum by increasingly correcting the engine generated power Pe and decreasingly correcting the transmission transfer power Pc.

In the case of the pattern (4) in which a downshift is carried out in the negative correlation region, the second MG rotation speed ωm increases; however, the total energy Esum decreases. In this case, the ECU 1000 facilitates a decrease in the total energy Esum by decreasingly correcting the engine generated power Pe and increasingly correcting the transmission transfer power Pc.

In this way, even when a shift of the same type is carried out, the ECU 1000 inverts the direction in which the engine generated power Pe is corrected and the direction in which the transmission transfer power Pc is corrected on the basis of whether the shift is carried out in the positive correlation region or the negative correlation region. Correction modes in the case of the patterns (2), (4) are opposite to correction modes in the ordinary engine vehicle.

Figure 6:
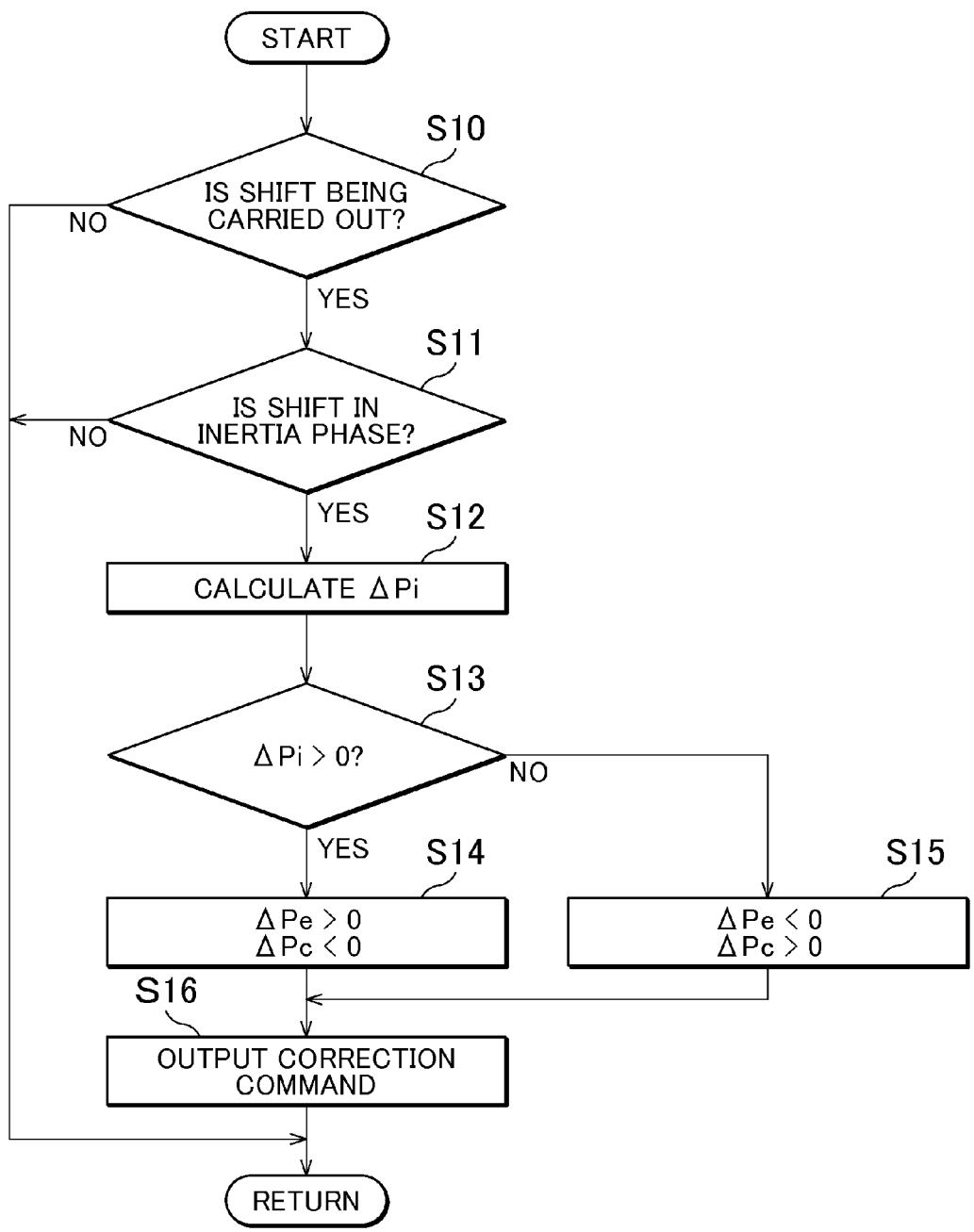
FIG. 6 is a flowchart that shows an example of the procedure of the ECU according to the first embodiment.

FIG. 6 is a flowchart that shows an example of the procedure in the case where the ECU 1000 corrects the engine generated power Pe and the transmission transfer power Pc. In S10, the ECU 1000 determines whether a shift is being carried out. When no shift is being carried out (NO in S10), the ECU 1000 ends the process.

When a shift is being carried out (YES in S10), the ECU 1000 determines in S11 whether the shift is in the inertia phase. In the inertia phase, the input shaft rotation speed of the automatic transmission 500 varies from a pre-shift synchronous rotation speed (=(output shaft rotation speed)×(pre-shift speed ratio)) toward a post-shift synchronous rotation speed (=(output shaft rotation speed)×(post-shift speed ratio)). When the shift is not in the inertia phase (NO in S11), the ECU 1000 ends the process.

When the shift is in the inertia phase (YES in S11), the ECU 1000 calculates a variation per unit time in the total energy Esum (=inertia power) in S12. Hereinafter, the "variation per unit time in the total energy Esum" is also simply referred to as "total energy variation rate $\Delta Pi$".

For example, the ECU 1000 stores the above-described equal-energy curve group as shown in FIG. 4 as a map in advance, obtains a variation amount in the total energy Esum, corresponding to an operating point variation per unit time by consulting the map, and sets the obtained variation amount as the total energy variation rate $\Delta Pi$. The total energy variation rate $\Delta Pi$ may be calculated with the use of another method.

In S13, the ECU 1000 determines whether the total energy variation rate $\Delta Pi$ is higher than 0 (that is, whether the total energy Esum has increased in a unit time period).

When the total energy variation rate $\Delta Pi$ is higher than 0 (YES in S13), that is, in the case of the above-described pattern (2) or pattern (3) shown in FIG. 4 and FIG. 5, the ECU 1000 increasingly corrects the engine generated power Pe by setting the engine generated power correction amount $\Delta Pe$ as a positive predetermined value and decreasingly corrects the transmission transfer power Pc by setting the transmission transfer power correction amount $\Delta Pc$ as a negative predetermined value in S14. At this time, a weight may be assigned to one of the correction amounts. One of the correction amounts may be set to 0 (only one correction may be performed).

On the other hand, when the total energy variation rate $\Delta Pi$ is lower than or equal to 0 (NO in S13), that is, in the case of the above-described pattern (1) or pattern (4) shown in FIG. 4 and FIG. 5, the ECU 1000 decreasingly corrects the engine generated power Pe by setting the engine generated power correction amount $\Delta Pe$ as a negative predetermined value and increasingly corrects the transmission transfer power Pc by setting the transmission transfer power correction amount $\Delta Pc$ as a positive predetermined value in S15. At this time, as in the case of S14, a weight may be assigned to one of the correction amounts. One of the correction amounts may be set to 0 (only one correction may be performed).

In S16, the ECU 1000 outputs command signals (throttle control signal, ignition timing control signal, hydraulic pressure control signal) for performing a correction with the correction amounts set in S14 or S15, to the engine 100 and the automatic transmission 500.

Figure 7:
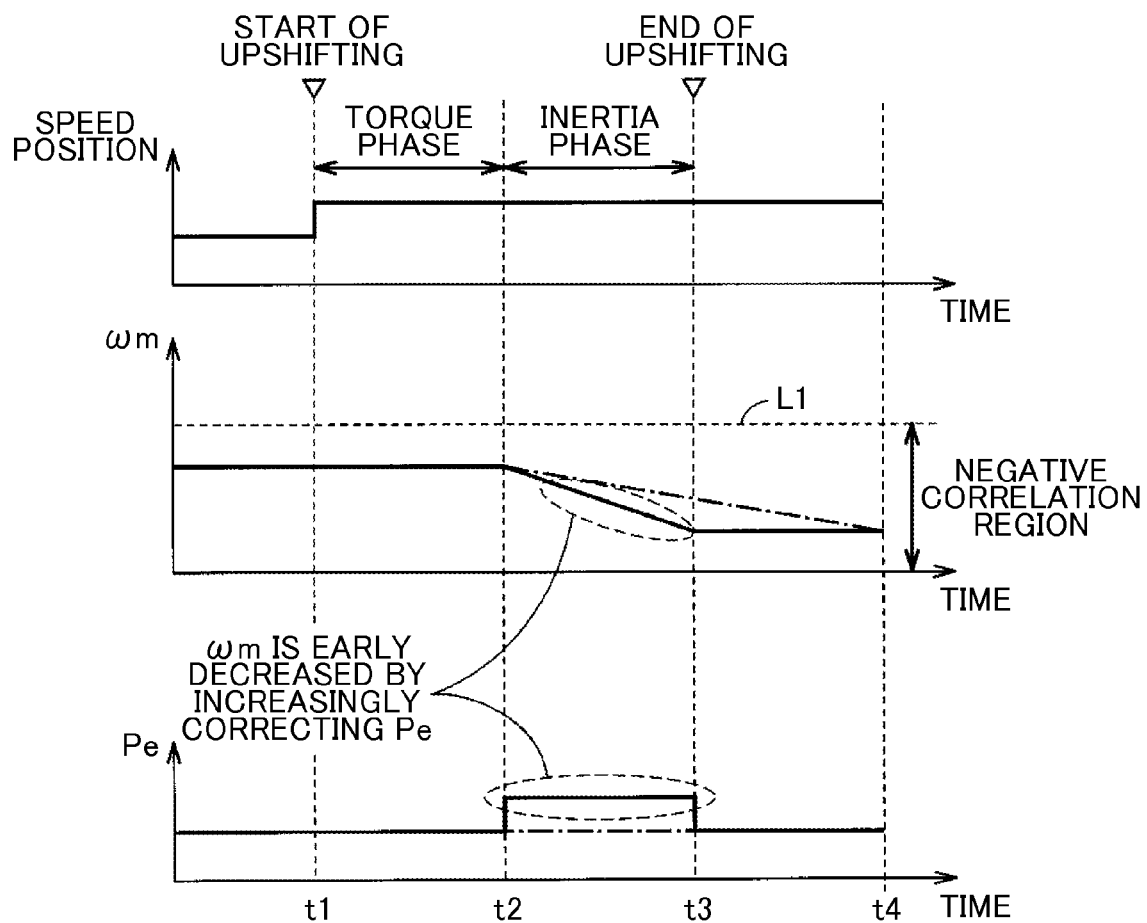
FIG. 7 is a time chart that shows a state of a variation in second MG rotation speed $\omega m$ and a variation in engine generated power Pe according to the first embodiment.

FIG. 7 is a time chart that shows a state of a variation in the second MG rotation speed ωm and a variation in the engine generated power Pe in the case where an upshift is carried out in the negative correlation region (in the case of the pattern (2) in FIG. 4 and FIG. 5). FIG. 7 illustrates the case where only the engine generated power Pe is corrected.

When an upshift is started at time t1, a torque phase initially begins. At time t2, the torque phase ends, and an inertia phase begins. With the beginning of the inertia phase, the second MG rotation speed ωm starts decreasing from a pre-shift synchronous rotation speed toward a post-shift synchronous rotation speed.

At this time, the second MG rotation speed ωm falls within the negative correlation region (the region in which ωm<L1), so the total energy Esum increases with a decrease in the second MG rotation speed ωm. Therefore, the total energy variation rate $\Delta Pi$ is positive. In this case, the ECU 1000 increasingly corrects the engine generated power Pe. Thus, it is possible to early decrease the second MG rotation speed ωm by facilitating an increase in the total energy Esum.

Therefore, it is possible to achieve an appropriate shifting time by avoiding stagnation of the shift.

For example, when the engine generated power Pe is not increasingly corrected as indicated by the alternate long and short dashed line, the second MG rotation speed ωm gently decreases, so upshift end time delays to time t4. In contrast to this, in the present embodiment, a decrease in the second MG rotation speed ωm is facilitated by increasingly correcting the engine generated power Pe, so upshift end time is time t3 earlier than time t4. Thus, it is possible to reduce the shifting time.

As described above, the ECU 1000 according to the present embodiment determines the direction in which the engine generated power Pe is corrected and the direction in which the transmission transfer power Pc is corrected on the basis of a variation in the whole rotation energy of the power split unit 300 when the automatic transmission 500 is shifting in the vehicle 1 in which the power split unit 300 (planetary gear mechanism) is provided between the engine 100 and the automatic transmission 500. Thus, even in the case where a shift is carried out in any of the positive correlation region and the negative correlation region shown in FIG. 4, it is possible to achieve an appropriate shifting time by appropriately preventing stagnation of the shift.

The above-described first embodiment may be, for example, modified as follows. A first alternative embodiment to the first embodiment will be described below. In the above-described processes of S14 and S15 of the flowchart of FIG. 6, the absolute value (magnitude) of the engine generated power correction amount ΔPe and the absolute value (magnitude) of the transmission transfer power correction amount ΔPc may be changed on the basis of the absolute value of the total energy variation rate ΔPi.

Figure 8:
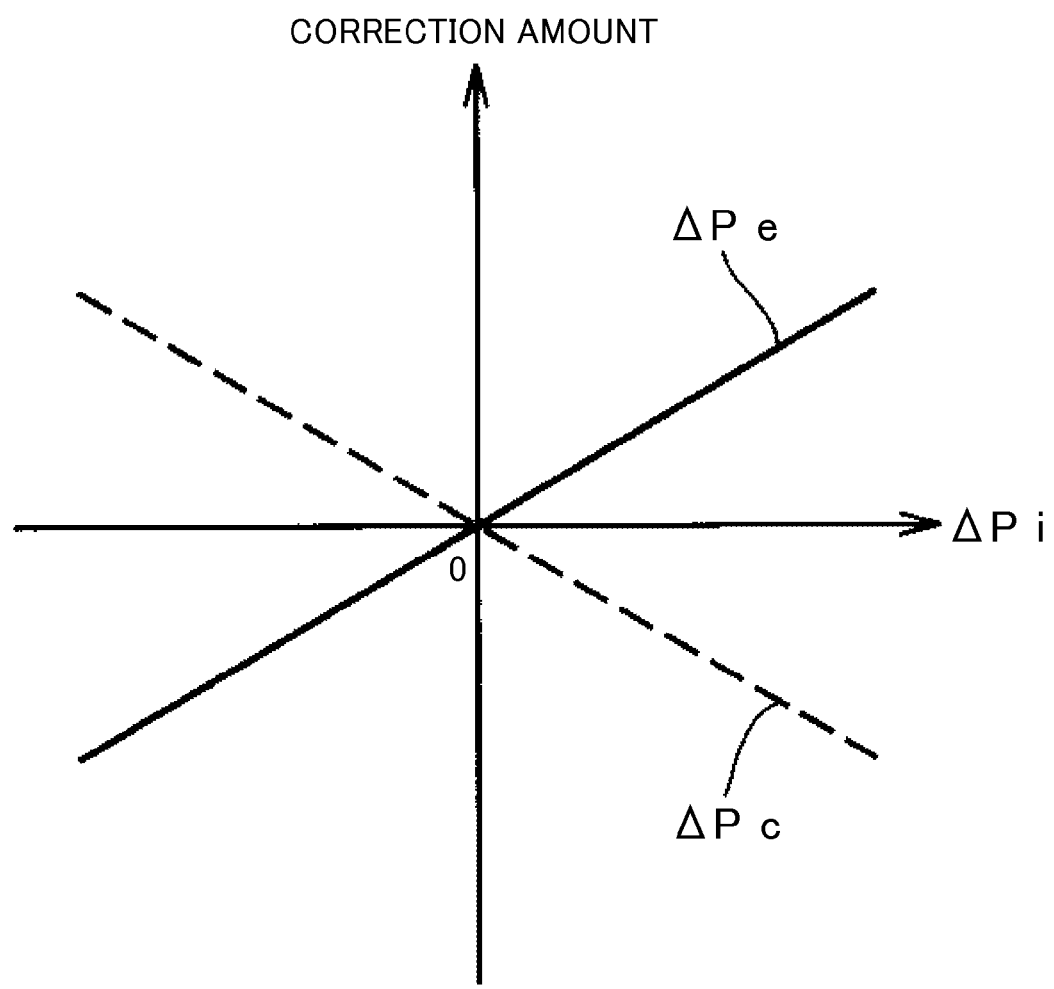
FIG. 8 is a graph that shows an example of the correlation among a total energy variation rate $\Delta Pi$, an engine generated power correction amount $\Delta Pe$ and a transmission transfer power correction amount $\Delta Pc$ according to the first embodiment.

FIG. 8 is a view that shows an example of the correlation among the total energy variation rate ΔPi, the engine generated power correction amount ΔPe and the transmission transfer power correction amount ΔPc. As shown in FIG. 8, the absolute value of the engine generated power correction amount ΔPe and the absolute value of the transmission transfer power correction amount ΔPc may be increased as the absolute value of the total energy variation rate ΔPi increases. With this configuration, it is possible to perform a further appropriate correction that takes the absolute value of the total energy variation rate ΔPi into consideration, so it is possible to achieve a further appropriate shifting time.

Furthermore, the absolute value of the engine generated power correction amount ΔPe and the absolute value of the transmission transfer power correction amount ΔPc may be changed on the basis of battery input/output allowance electric powers in addition to the total energy variation rate ΔPi. The battery input/output allowance electric powers are a difference between an actual input electric power Pbin of the battery 700 and the battery inputtable electric power WIN (hereinafter, referred to as "battery input allowance electric power ΔPbin") and a difference between an actual output electric power Pbout of the battery 700 and the battery outputtable electric power WOUT (hereinafter, referred to as "battery output allowance electric power ΔPbout").

Figure 9:
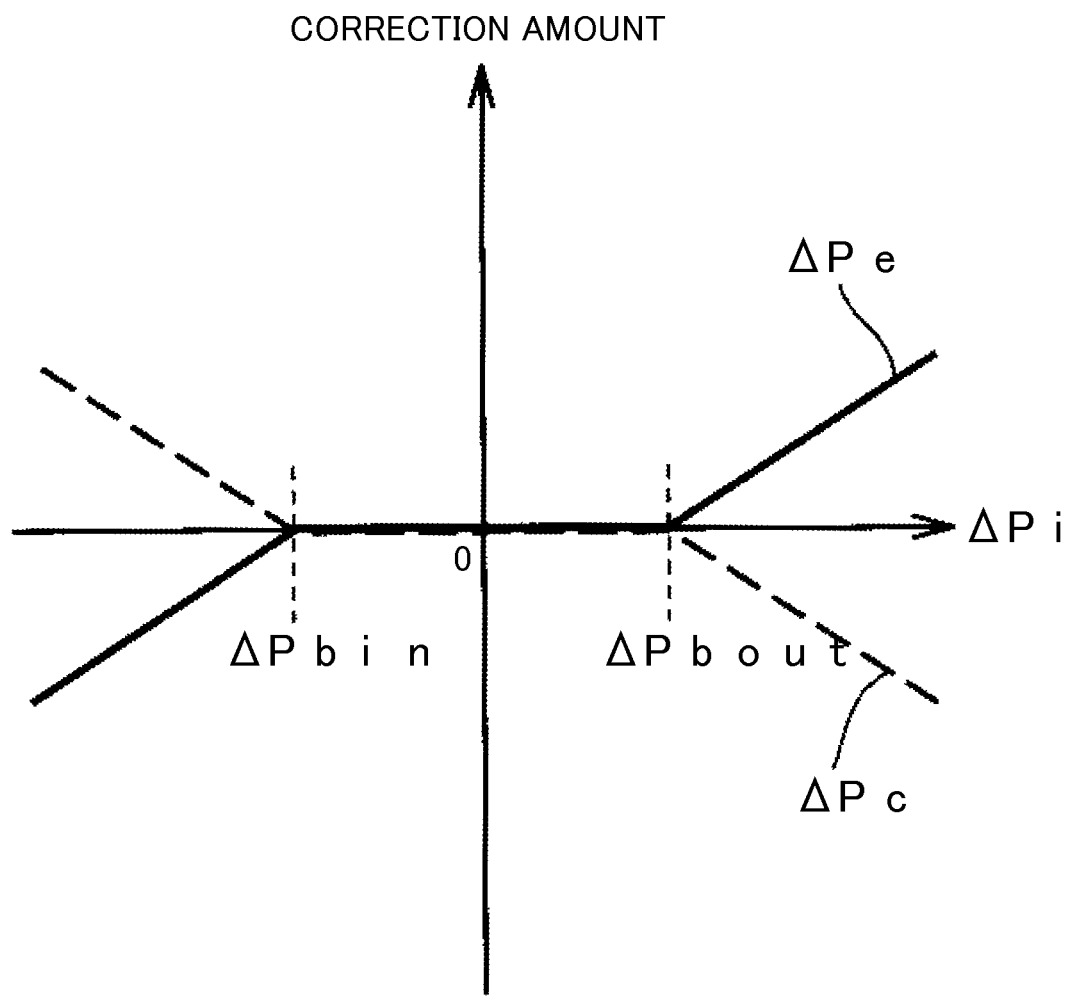
FIG. 9 is a graph that shows an example of the correlation among a total energy variation rate $\Delta Pi$, battery input/output allowance electric powers $\Delta Pbin$, $\Delta Pbout$, an engine generated power correction amount $\Delta Pe$ and a transmission transfer power correction amount $\Delta Pc$.

FIG. 9 is a graph that shows an example of the correlation among the total energy variation rate ΔPi, the battery input/output allowance electric powers ΔPbin, ΔPbout, the engine generated power correction amount ΔPe and the transmission transfer power correction amount ΔPc. As shown in FIG. 9, when the total energy variation rate ΔPi falls within the range between the battery input/output allowance electric powers ΔPbin, ΔPbout (ΔPbin<ΔPi<ΔPbout), it is possible to ensure a variation in the total energy Esum through an increase or decrease in electric power input to or output from the battery 700 (an increase or decrease in the amount of electric power generated by or the amount of electric power consumed in at least one of the first MG 200 and the second MG 400), so the engine generated power correction amount ΔPe and the transmission transfer power correction amount ΔPc are set to 0. On the other hand, when the total energy variation rate ΔPi falls outside the range between the battery input/output allowance electric powers ΔPbin, ΔPbout (ΔPi<ΔPbin or ΔPi>ΔPbout), only an increase or decrease in electric power input to or output from the battery 700 cannot sufficiently ensure a variation in the total energy Esum, so the insufficient amount is ensured by the engine generated power correction amount ΔPe and the transmission transfer power correction amount ΔPc. With this configuration, it is possible to minimize deterioration of fuel economy due to a correction of the engine generated power Pe and deterioration of drivability due to a correction of the transmission transfer power Pc while achieving an appropriate shifting time.

Next, a second alternative embodiment to the first embodiment will be described. In the above-described processes of S14 and S15 of the flowchart of FIG. 6, the engine generated power correction amount ΔPe and the transmission transfer power correction amount ΔPc may be calculated as follows.

A power balance expression of the power split unit 300 is expressed by the following mathematical expression (b) where the total inertia power of the power split unit 300 is denoted by "Pi".

$$Pe+Pb=Pc+Pi \tag{b}$$

The left-hand side (the sum of the engine generated power Pe and the output power Pb of the battery 700) of the mathematical expression (b) is a power that is input to the power split unit 300. On the other hand, the right-hand side (the sum of the transmission transfer power Pc and the inertia power Pi of the power split unit 300) of the mathematical expression (b) is a power that is output from the power split unit 300. In the mathematical expression (b), loss energy that is consumed as heat, or the like, is omitted.

In order for the above-described power balance expression (b) to be ensured in a post-shift state, the engine generated power correction amount ΔPe and the transmission transfer power correction amount ΔPc may be calculated in the following mathematical expressions (c), (d). Thus, it is possible to ensure a post-shift power balance in a feedback manner.

$$\Delta Pe=[(Pc \text{ estimated value})+\Delta Pi-Pb]-(Pe \text{ estimated value}) \tag{c}$$

$$\Delta Pc=[(Pe \text{ estimated value})+Pb-\Delta Pi]-(Pc \text{ estimated value}) \tag{d}$$

A value obtained by correcting a Pe command value using a differential value between the Pe command value and a Pe estimated value at the time of the start of rotation variation may be used as the "Pe estimated value" that is used in the mathematical expressions (c), (d). At this time, a value filtered for noise prevention may be used as the differential value.

Next, a second embodiment will be described. In the second embodiment, which one of the engine generated power Pe and the transmission transfer power Pc is preferentially corrected is changed on the basis of the required driving power Pvreq and the transmission transfer power Pc. The other structure, function and process are the same as those of the above-described first embodiment, so the detailed description is not repeated.

The ECU 1000 according to the second embodiment normally preferentially corrects the engine generated power Pe and, when it is insufficient through a correction of the engine generated power Pe, corrects the transmission transfer power Pc. For example, in the case where the engine generated power Pe is decreasingly corrected by retarding the ignition timing, if the amount of retardation of the ignition timing is limited in order to prevent misfire and prevent catalyst overheating, a decrease correction amount of the engine generated power Pe is smaller than a required amount. The transmission transfer, power Pc is increased by the amount of power corresponding to the insufficient amount.

On the other hand, when the accelerator operation amount A steeply increases from a value lower than a predetermined value to a value higher than the predetermined value (in a period of time shorter than a predetermined period of time) and the transmission transfer power Pc is lower than a predetermined power due to variations in hydraulic pressure, and the like, the ECU 1000 preferentially corrects the transmission transfer power Pc and corrects the engine generated power Pe by an insufficient amount through the correction of the transmission transfer power Pc.

For example, in the case where the transmission transfer power Pc is lower than assumed due to the influence of variations in hydraulic pressure, and the like, during shifting in which importance is placed on post-shift acceleration (for example, during power-on downshifting), if the engine generated power Pe is decreased, it is assumed that slow post-shift acceleration occurs. In such a case, the ECU 1000 according to the present embodiment preferentially increasingly corrects the transmission transfer power Pc rather than decreasingly corrects the engine generated power Pe. Thus, it is possible to prevent slow post-shift acceleration while achieving an appropriate shifting time.

In addition, when the transmission transfer power Pc is lower than the predetermined power due to variations in hydraulic pressure, and the like, during shifting that occurs as a result of a variation in the accelerator operation amount A from a value lower than the predetermined operation amount to a value higher than the predetermined operation amount, the engine rotation speed $\omega e$ steeply increases. In such a case, when the engine generated power Pe is decreased, it is possible to suppress a steep increase in the engine rotation speed we during shifting; however, it is assumed that slow post-shift acceleration occurs. In such a case, the ECU 1000 according to the present embodiment preferentially increasingly corrects the transmission transfer power Pc rather than decreasingly corrects the engine generated power Pe. Thus, it is possible to prevent slow post-shift acceleration while achieving an appropriate shifting time.

Figure 10:
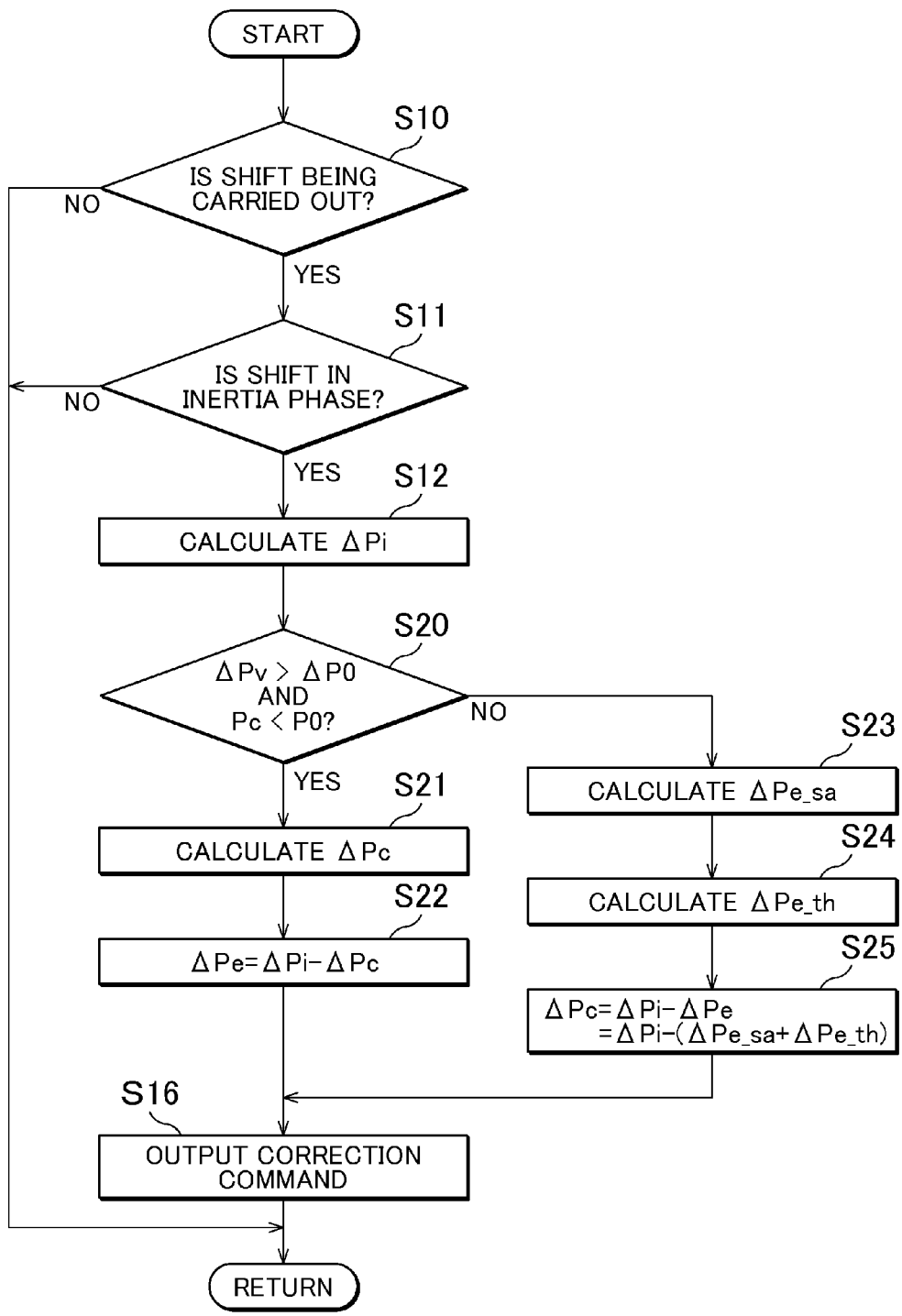
FIG. 10 is a flowchart that shows an example of the procedure of an ECU according to a second embodiment of the invention.

FIG. 10 is a flowchart that shows an example of the procedure in the case where the ECU 1000 according to the present embodiment corrects the engine generated power Pe and the transmission transfer power Pc. Among steps shown in FIG. 10, like step numbers denote the same steps as those shown in FIG. 6, so the detailed description is not repeated here.

In S20, the ECU 1000 determines whether an amount of increase per unit time in the required driving power Pvreq (hereinafter, referred to as "vehicle required driving power increase rate $\Delta Pv$") is higher than a predetermined rate $\Delta P0$ and the transmission transfer power Pc is lower than a predetermined power P0.

When the vehicle required driving power increase rate $\Delta Pv$ is higher than the predetermined rate $\Delta P0$ and the transmission transfer power Pc is lower than the predetermined power P0 (YES in S20), the ECU 1000 preferentially corrects the transmission transfer power Pc rather than the engine generated power Pe. Specifically, the ECU 1000 calculates the transmission transfer power correction amount $\Delta Pc$ in S21, and sets a value obtained by subtracting the transmission transfer power correction amount $\Delta Pc$ from the total energy variation rate $\Delta Pi$ as the engine generated power correction amount $\Delta Pe$ in S22.

On the other hand, when the vehicle required driving power increase rate $\Delta Pv$ is lower than or equal to the predetermined rate $\Delta P0$ or the transmission transfer power Pc is higher than or equal to the predetermined power P0 (NO in S20), the ECU 1000 preferentially corrects the engine generated power Pe rather than the transmission transfer power Pc. Specifically, the ECU 1000 calculates an engine generated power correction amount $\Delta Pe\_sa$ achieved by changing the ignition timing in S23, calculates an engine generated power correction amount $\Delta Pe\_th$ achieved by changing the throttle opening degree (intake air amount) in S24, and sets a value obtained by subtracting the engine generated power correction amount $\Delta Pe$ (=$\Delta Pe\_sa+\Delta Pe\_th$) from the total energy variation rate $\Delta Pi$ as the transmission transfer power correction amount $\Delta Pc$ in S25.

As described above, the ECU 1000 according to the present embodiment changes which one of the engine generated power Pe and the transmission transfer power Pc is preferentially corrected on the basis of the required driving power Pvreq and the transmission transfer power Pc. Thus, it is possible to prevent slow post-shift acceleration while achieving an appropriate shifting time.

Next, a third embodiment will be described. In the above-described first embodiment, the total energy variation rate $\Delta Pi$ is calculated after the beginning of the inertia phase, and a direction in which the engine generated power Pe is corrected and a direction in which the transmission transfer power Pc is corrected are determined on the basis of the calculated result.

In contrast to this, in the third embodiment, a variation in the total energy Esum before and after shifting (a differential between the pre-shift total energy Esum and the post-shift total energy Esum) is predicted before the beginning of the inertia phase, and a direction in which the engine generated power Pe is corrected, a direction in which the transmission transfer power Pc is corrected, a correction amount of the engine generated power Pe and a correction amount of the transmission transfer power Pc are determined on the basis of the predicted result. Thus, it is possible to output a correction command at optimal timing (for example, before the beginning of the inertia phase) that is set by considering the response from the output of the correction command to an actual variation in power.

Figure 11:
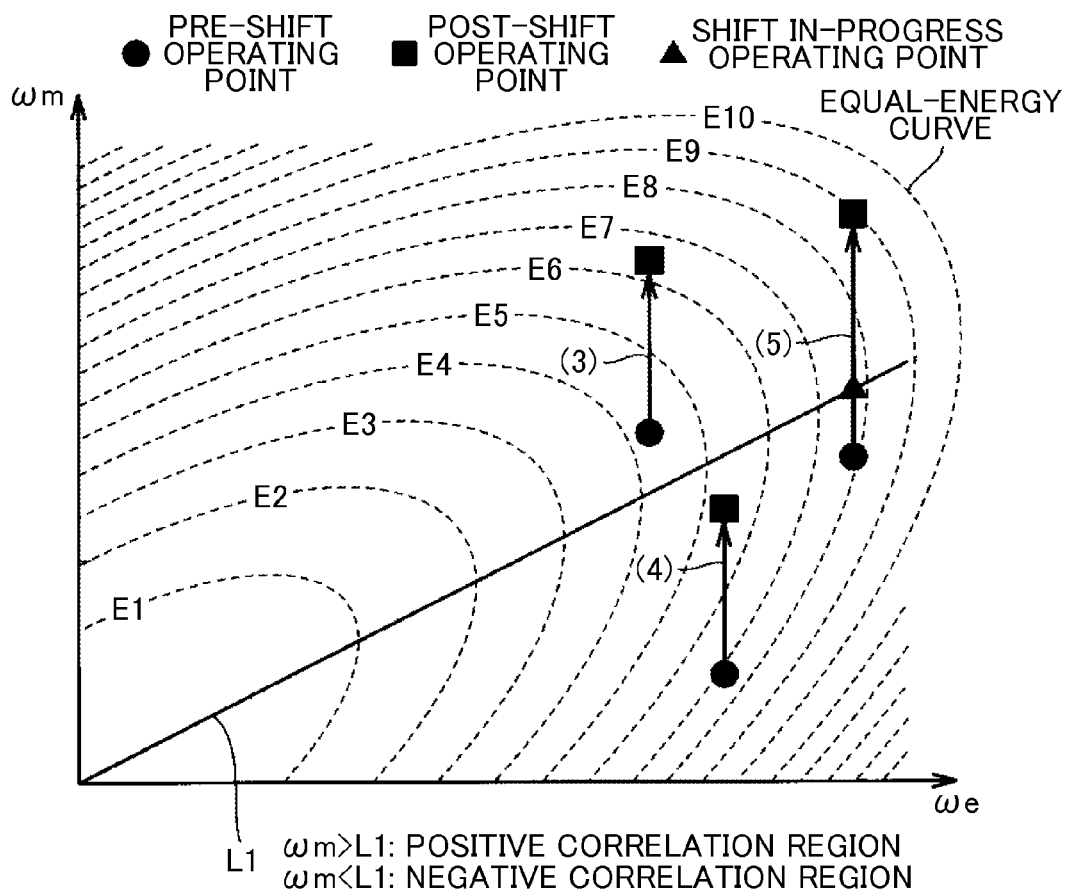
FIG. 11 is a view that shows the distribution of the whole rotation energy of the power split unit according to a third embodiment of the invention.

FIG. 11 is a view that shows the distribution of the total energy Esum using an equal-energy curve group as in the case of FIG. 4.

FIG. 12 is a view that shows correction methods for the engine generated power Pe and the transmission transfer power Pc, executed by the ECU 1000 according to the present embodiment.

When a shift is started, the ECU 1000 identifies a pre-shift operating point (an engine rotation speed we and a second MG rotation speed $\omega m$ at the start of shifting), and predicts a post-shift operating point (a post-shift engine rotation speed we and a post-shift second MG rotation speed $\omega m$). The ECU 1000 calculates a pre-shift total energy Esum and a post-shift total energy Esum by consulting an equal-energy curve map as shown in FIG. 11, and calculates a differential therebetween. A direction in which the engine generated power Pe is corrected, a direction in which the transmission transfer power Pc is corrected, a correction amount of the engine generated power Pe and a correction amount of the transmission transfer power Pc are determined.

For example, in the case of the pattern (3) in which a downshift is carried out in the positive correlation region, the second MG rotation speed ωm increases from the start of shifting to the end of shifting, and, accordingly, the total energy Esum also increases. In this case, as shown in FIG. 12, the ECU 1000 increasingly corrects the engine generated power Pe and decreasingly corrects the transmission transfer power Pc.

On the other hand, in the case of the pattern (4) in which a downshift is carried out in the negative correlation region, in a period from the start of shifting to the end of shifting, the second MG rotation speed ωm increases; however, the total energy Esum decreases. In this case, as shown in FIG. 12, the ECU 1000 decreasingly corrects the engine generated power Pe and increasingly corrects the transmission transfer power Pc.

In the case of the pattern (5) in which an operating point passes through the boundary line L1 in a period from the start of shifting to the end of shifting, the second MG rotation speed ωm increases from the start of shifting to the end of shifting; however, the total energy Esum decreases before passing through the boundary line L1, becomes a local minimum at the time of passing through the boundary line L1 and increases after passing through the boundary line L1. In such a case, the ECU 1000 determines a direction in which the engine generated power Pe is corrected, a direction in which the transmission transfer power Pc is corrected, a correction amount of the engine generated power Pe and a correction amount of the transmission transfer power Pc such that a rotation variation before passing through the boundary line L1 is facilitated. Specifically, as shown in FIG. 12, the ECU 1000 decreasingly corrects the engine generated power Pe and increasingly corrects the transmission transfer power Pc before passing through the boundary line L1. At this time, the ECU 1000 sets an engine generated power decrease correction amount ΔPe and a transmission transfer power increase correction amount ΔPc on the basis of the differential between the pre-shift total energy Esum and the total energy Esum at the time of passing through the boundary line L1 (the local minimum value of the total energy Esum during shifting). After passing through the boundary line L1, the ECU 1000 does not correct the engine generated power Pe or the transmission transfer power Pc (sets the correction amounts to 0).

Although not described in the case where an upshift is carried out in FIG. 11 and FIG. 12, similar correction methods to those in the case of a downshift are applied even in the case where an upshift is carried out.

Figure 13:
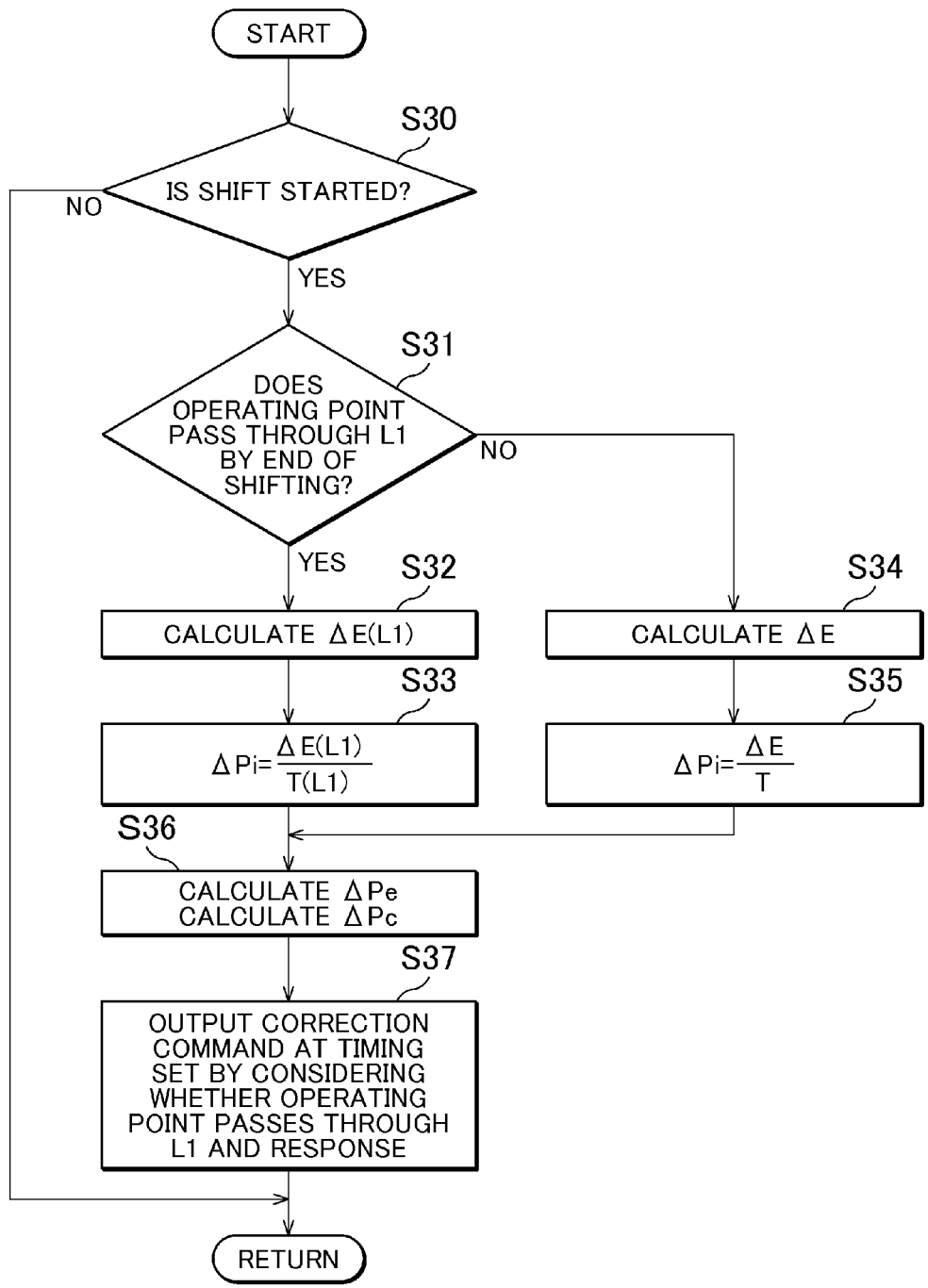
FIG. 13 is a flowchart that shows an example of the procedure of the ECU according to the third embodiment of the invention.

FIG. 13 is a flowchart that shows an example of the procedure in the case where the ECU 1000 according to the present embodiment corrects the engine generated power Pe and the transmission transfer power Pc.

In S30, the ECU 1000 determines whether a shift is started. When a shift is not started (NO in S30), the ECU 1000 ends the process.

When a shift is started (YES in S30), the ECU 1000 determines in S31 whether an operating point that is determined by the engine rotation speed we and the second MG rotation speed ωm passes the boundary line L1 by the end of shifting. Specifically, the ECU 1000 identifies a pre-shift operating point and predicts a post-shift operating point, and determines whether the boundary line L1 is present between the pre-shift operating point and the post-shift operating point on the map shown in FIG. 11.

When the operating point passes the boundary line L1 (YES in S31), the ECU 1000 calculates a variation amount in the total energy Esum (hereinafter, referred to as "total energy, variation amount ΔE(L1)") from the start of shifting to the time of passing through the boundary line L1 using the map shown in FIG. 11 in S32. The ECU 1000 calculates a value obtained by dividing the total energy variation amount ΔE(L1) by a predicted time T(L1) from the start of shifting to the time of passing through the boundary line L1 as the total energy variation rate ΔPi in S33.

On the other hand, when the operating point does not pass through the boundary line L1 (NO in S31), the ECU 1000 calculates a variation amount in the total energy Esum (hereinafter, referred to as "total energy variation amount ΔE") from the start of shifting to the end of shifting in S34. The ECU 1000 calculates a value obtained by dividing the total energy variation amount ΔE by the predicted shifting time T as the total energy variation rate ΔPi in S35.

In S36, the ECU 1000 calculates the engine generated power correction amount ΔPe and the transmission transfer power correction amount ΔPc. For example, the ECU 1000 calculates the following mathematical expressions (e), (f).

$$\Delta Pe = \{((Pc \text{ estimated value}) + \Delta Pi - Pb) - (Pe \text{ estimated value})\} \times \text{Gain} \quad (e)$$

$$\Delta Pc = \{((Pe \text{ estimated value}) + Pb - \Delta Pi) - (Pc \text{ estimated value})\} \times \text{Gain} \quad (f)$$

In S37, the ECU 1000 outputs command signals (throttle control signal, ignition timing control signal, hydraulic pressure control signal) for performing a correction with the correction amounts calculated in S36, to the engine 100 and the automatic transmission 500 at optimal timing that is set by considering whether an operating point passes through the boundary line L1, the response of the engine generated power Pe through throttle control, the response of the engine generated power Pe through ignition timing control, the response of the transmission transfer power Pc through hydraulic pressure control, and the like.

As described above, the ECU 1000 according to the third embodiment predicts a variation in the total energy Esum before and after shifting before the beginning of the inertia phase, and determines a direction in which the engine generated power Pe is corrected, a direction in which the transmission transfer power Pc is corrected, a correction amount of the engine generated power Pe and a correction amount of the transmission transfer power Pc on the basis of the predicted result. Thus, it is possible to output a correction command at optimal timing that is set by considering whether an operating point passes through the boundary line L1 and the response of power correction. For example, there is a slight time lag between when the throttle control signal is output and when the engine generated power Pe actually varies. In consideration of such a time lag, it is possible to output a command signal before the beginning of the inertia phase.

The configuration of the vehicle 1 according to the above-described first to third embodiments may be, for example, modified as follows.

Figure 14:
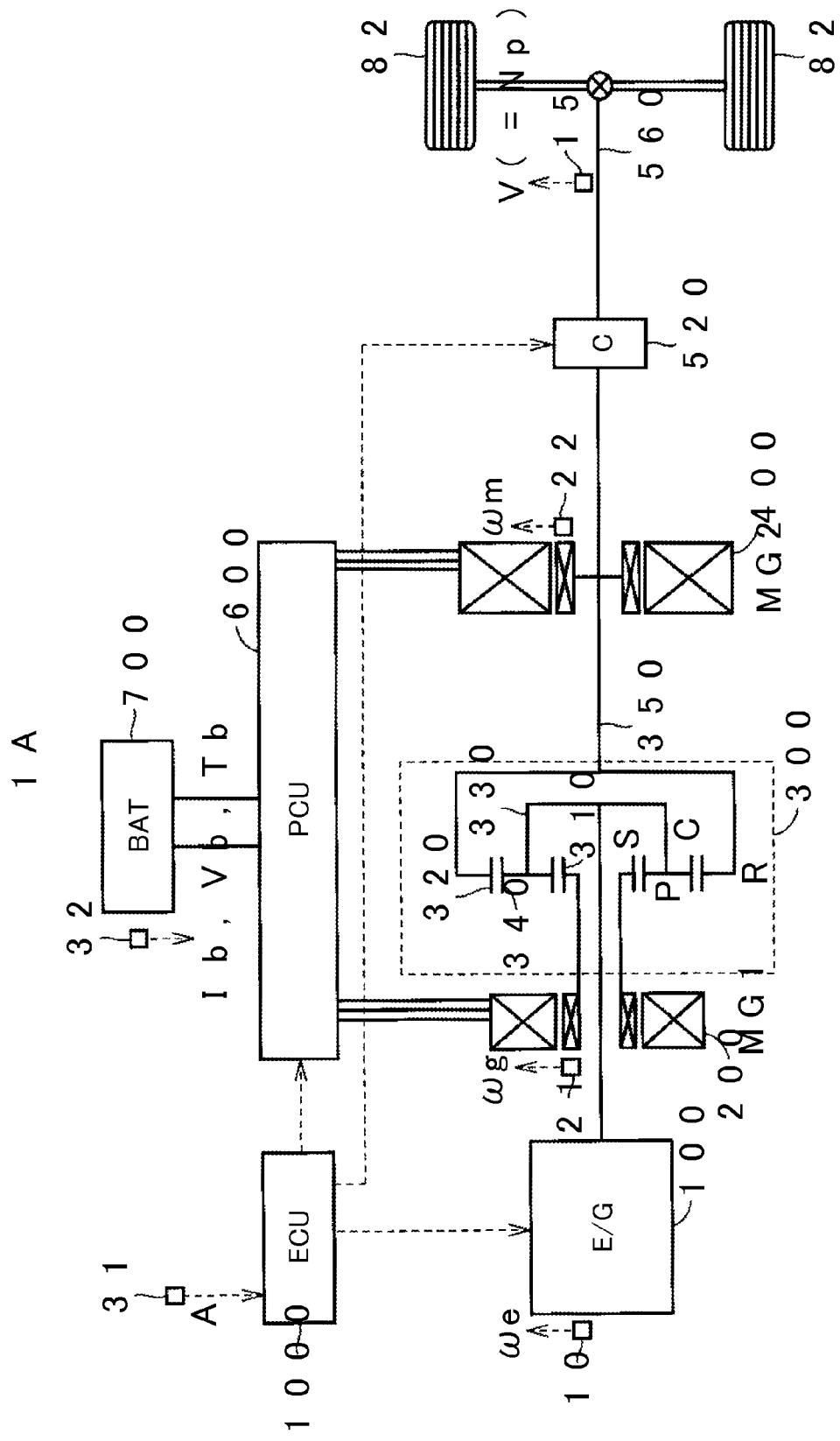
FIG. 14 is a view that shows a first alternative embodiment to the configuration of the vehicle according to the embodiments of the invention.

FIG. 14 is a view that shows a first alternative embodiment to the configuration of the vehicle 1. In the above-described first to third embodiments, the automatic transmission 500 is provided between the power split unit 300 and the drive wheels 82. Instead, as in the case of a vehicle 1A shown in FIG. 14, a clutch 520 may be provided instead of the automatic transmission 500.

Figure 15:
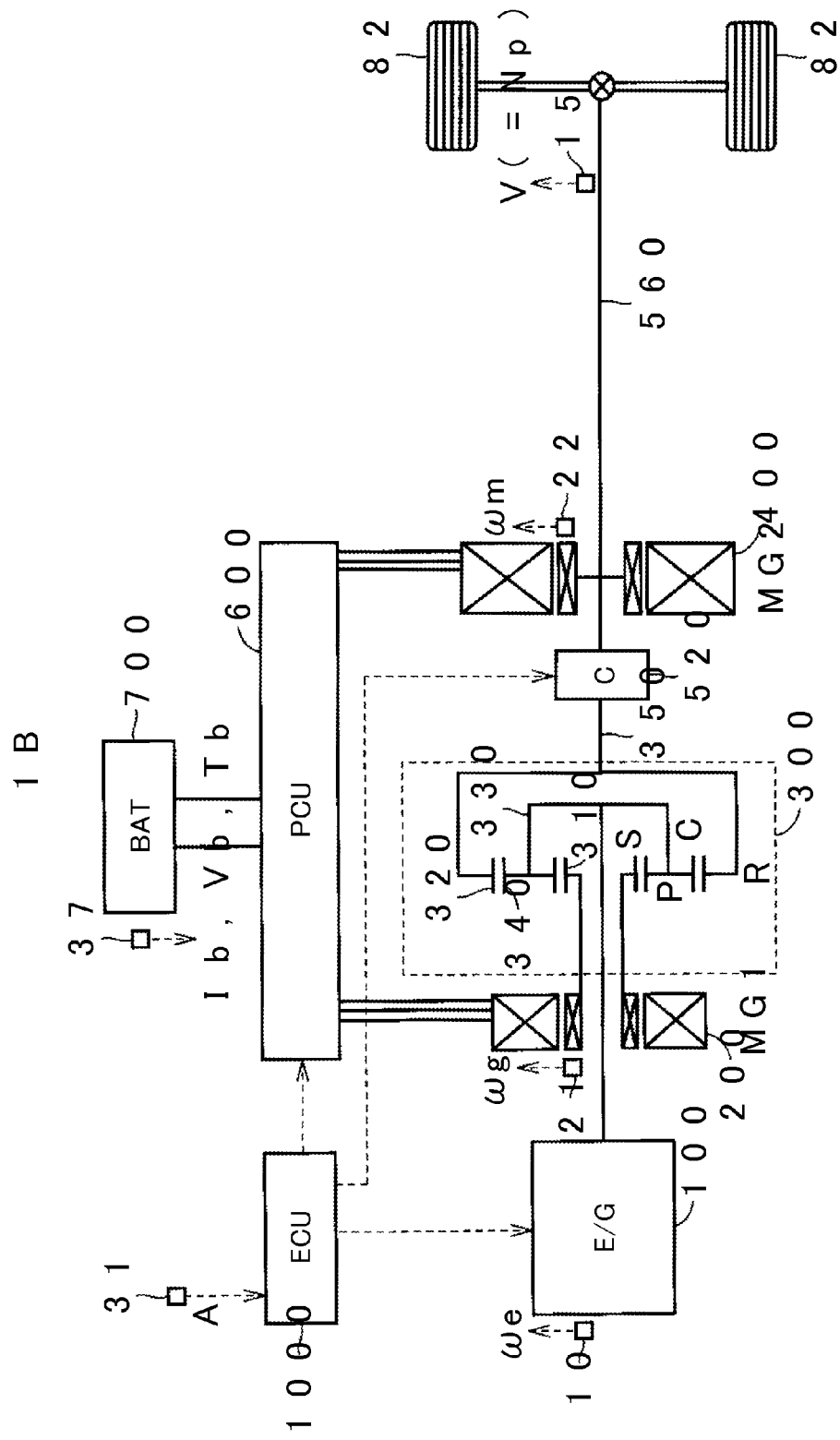
FIG. 15 is a view that shows a second alternative embodiment to the configuration of the vehicle according to the embodiments of the invention.

FIG. 15 is a view that shows a second alternative embodiment to the configuration of the vehicle 1. In the above-described vehicle 1A shown in FIG. 14, the rotor of the second MG 400 is connected to the rotary shaft 350 (between the ring gear (R) 320 and the input shaft of the clutch 520).

Instead, as in the case of a vehicle 1B shown in FIG. 15, the rotor of the second MG 400 may be connected to the drive shaft 560 (between the output shaft of the clutch 520 and the drive wheels 82).

The power split unit 300 may be a differential mechanism having the above-described positive correlation region and negative correlation region as shown in FIG. 4, specifically, may be a differential mechanism having at least three rotating elements including a first rotating element coupled to the engine 100 and a second rotating element coupled to the drive wheels 82 via the automatic transmission 500 (or the clutch 520). Thus, the engine 100 is not necessarily connected to the carrier (C) 330, and the automatic transmission 500 is not necessarily connected to the ring gear (R) 320.

It is not always required to include the first MG 200 or the second MG 400. The embodiments described above are illustrative and not restrictive in all respects. The scope of the invention is defined not by the above description but by the appended claims. The scope of the invention is intended to encompass all modifications within the scope of the appended claims and equivalents thereof.

What is claimed is:

1. A vehicle comprising:
   an internal combustion engine configured to generate power for rotating a drive wheel;
   an engagement device provided between the internal combustion engine and the drive wheel, the engagement device being configured to switch into any one of an engaged state, a slipped state and a released state;
   a differential mechanism provided between the internal combustion engine and the engagement device, the differential mechanism having at least three rotating elements including a first rotating element coupled to the internal combustion engine and a second rotating element coupled to the drive wheel via the engagement device; and
   a controller configured to control the internal combustion engine and the engagement device, the controller being configured to correct at least one of the power generated by the internal combustion engine and power transmitted by the engagement device on the basis of a variation in rotation energy of the differential mechanism, when the engagement device is in the slipped state or the released state.

2. The vehicle according to claim 1, wherein
   the controller is configured to at least increasingly correct the generated power or decreasingly correct the transmitted power when the rotation energy increases, the controller being configured to at least decreasingly correct the generated power or increasingly correct the transmitted power when the rotation energy decreases.

3. The vehicle according to claim 2, wherein
   the controller is configured to increase a correction amount of at least one of the generated power and the transmitted power as a variation amount in the rotation energy increases.

4. The vehicle according to claim 1, wherein
   the differential mechanism includes a third rotating element in addition to the first and second rotating elements,
   the vehicle further comprises a rotary electric machine coupled to the third rotating element and an electrical storage device configured to be able to exchange electric power with the rotary electric machine, and
   the controller is configured to change a correction amount of at least one of the generated power and the transmitted power on the basis of chargeable and dischargeable powers of the electrical storage device.

5. The vehicle according to claim 4, wherein
   the differential mechanism is a planetary gear mechanism including a sun gear; a ring gear; pinions meshed with the sun gear and the ring gear; and a carrier that holds the pinions such that the pinions are rotatable and revolvable, and
   the first rotating element is the carrier, the second rotating element is the ring gear, and the third rotating element is the sun gear.

6. The vehicle according to claim 1, wherein
   the controller is configured to calculate a total energy variation rate, the total energy variation rate being a variation amount per unit time in total energy that is a whole rotation energy of the differential mechanism, the controller being configured to change at least one of the absolute value of a correction amount of the generated power of the internal combustion engine and the absolute value of a correction amount of the transmitted power of the engagement device on the basis of the absolute value of the total energy variation rate.

7. The vehicle according to claim 6, further comprising:
   a rotary electric machine coupled to the third rotating element; and
   an electrical storage device configured to exchange electric power with the rotary electric machine, wherein
   the controller is configured to change at least one of the absolute value of the correction amount of the generated power of the internal combustion engine and the absolute value of the correction amount of the transmitted power of the engagement device on the basis of an input allowance electric power of the electrical storage device in addition to the total energy variation rate.

8. The vehicle according to claim 6, further comprising:
   a rotary electric machine coupled to the third rotating element; and
   an electrical storage device configured to exchange electric power with the rotary electric machine, wherein
   the controller is configured to change at least one of the absolute value of the correction amount of the generated power of the internal combustion engine and the absolute value of the correction amount of the transmitted power of the engagement device on the basis of an output allowance electric power of the electrical storage device in addition to the total energy variation rate.

9. The vehicle according to claim 1, wherein
   the controller is configured to change which one of the generated power and the transmitted power is preferentially corrected on the basis of a required driving power and the transmitted power.

10. The vehicle according to claim 9, wherein
    the controller is configured to preferentially increasingly correct the transmitted power rather than decreasingly correct the generated power when a variation rate of the required driving power is higher than a predetermined rate and the transmitted power is lower than a predetermined power.

11. The vehicle according to claim 1, wherein
    the engagement device is a transmission configured to be able to change a speed ratio, and the controller is configured to correct at least one of the generated power and the transmitted power on the basis of a variation in the rotation energy of the differential mechanism when the transmission is shifting.

12. The vehicle according to claim 11, wherein
in a first region in which a rotation speed of the second rotating element is higher than a boundary value determined on the basis of a rotation speed of the first rotating element, the rotation energy of the differential mechanism decreases with a decrease in the rotation speed of the second rotating element,
in a second region in which the rotation speed of the second rotating element is lower than the boundary value, the rotation energy of the differential mechanism increases with a decrease in the rotation speed of the second rotating element, and
the controller is configured to at least decreasingly correct the generated power or increasingly correct the transmitted power when the rotation speed of the second rotating element falls within the first region when the transmission is upshifting, the controller being configured to at least increasingly correct the generated power or decreasingly correct the transmitted power when the rotation speed of the second rotating element falls within the second region when the transmission is upshifting.

13. The vehicle according to claim 11, wherein
in a first region in which a rotation speed of the second rotating element is higher than a boundary value determined on the basis of a rotation speed of the first rotating element, the rotation energy of the differential mechanism increases with an increase in the rotation speed of the second rotating element,
in a second region in which the rotation speed of the second rotating element is lower than the boundary value, the rotation energy of the differential mechanism decreases with an increase in the rotation speed of the second rotating element, and
the controller is configured to at least increasingly correct the generated power or decreasingly correct the transmitted power when the rotation speed of the second rotating element falls within the first region when the transmission is downshifting, the controller being configured to at least decreasingly correct the generated power or increasingly correct the transmitted power when the rotation speed of the second rotating element falls within the second region when the transmission is downshifting.

14. The vehicle according to claim 11, wherein
the controller is configured to at least decreasingly correct the generated power or increasingly correct the transmitted power on the basis of a difference between the rotation energy at the start of shifting and the rotation energy at the local minimum, when there is a time at which the rotation energy of the differential mechanism is local minimum in a period from a start of shifting of the transmission and an end of shifting of the transmission.

* * * * *

UNITED STATES PATENT AND TRADEMARK OFFICE
CERTIFICATE OF CORRECTION

PATENT NO. : 8,932,178 B2
APPLICATION NO. : 14/134706
DATED : January 13, 2015
INVENTOR(S) : Shunya Kato et al.

It is certified that error appears in the above-identified patent and that said Letters Patent is hereby corrected as shown below:

In the specification

At column 6, line 65, change "ECU, 1000 controls" to -- ECU 1000 controls --.

At column 8, line 7, change "speed we (the" to -- speed ωe (the --.

At column 8, line 11, change "speed we and" to -- speed ωe and --.

At column 8, line 13, change "speed cog (the" to -- speed ωg (the --.

At column 8, line 17, change "speed we and" to -- speed ωe and --.

At column 8, line 52, change "speed we remains" to -- speed ωe remains --.

At column 13, line 8, change "transfer, power Pc" to -- transfer power Pc --.

At column 13, line 41, change "speed we during" to -- speed ωe during --.

At column 14, line 56, change "speed we and" to -- speed ωe and --.

At column 14, line 59, change "speed we and" to -- speed ωe and --.

At column 15, line 58, change "speed we and" to -- speed ωe and --.

At column 16, line 1, change "energy, variation" to -- energy variation --.

Signed and Sealed this
Tenth Day of November, 2015

Michelle K. Lee
*Director of the United States Patent and Trademark Office*